United States Patent [19]
Alberkrack et al.

[11] Patent Number: 5,920,181
[45] Date of Patent: Jul. 6, 1999

[54] BATTERY PROTECTION SYSTEM AND PROCESS FOR CHARGING A BATTERY

[75] Inventors: Jade Alberkrack, Tempe; Troy L. Stockstad, Phoenix, both of Ariz.

[73] Assignee: Motorola, Schaumburg, Ill.

[21] Appl. No.: 09/103,826

[22] Filed: Jun. 24, 1998

Related U.S. Application Data

[63] Continuation of application No. 08/833,437, Apr. 7, 1997, Pat. No. 5,804,944.

[51] Int. Cl.$^6$ ........................................................ H02J 7/00
[52] U.S. Cl. ............................................ 320/146; 320/163
[58] Field of Search ................................... 320/162, 139, 320/146

[56] References Cited

U.S. PATENT DOCUMENTS

| | | | |
|---|---|---|---|
| 3,614,581 | 10/1971 | Frost | 320/140 |
| 4,109,192 | 8/1978 | Burbank et al. | 320/166 |
| 4,246,529 | 1/1981 | Jurgens et al. | 320/39 |
| 4,647,834 | 3/1987 | Castleman | 320/43 |
| 4,791,350 | 12/1988 | Roof | 323/284 |
| 5,233,284 | 8/1993 | Mattsson | 320/14 |
| 5,289,103 | 2/1994 | Eccleston | 320/144 |
| 5,349,282 | 9/1994 | McClure | 320/32 |
| 5,648,714 | 7/1997 | Eryou et al. | 320/139 |
| 5,714,863 | 2/1998 | Hwang et al. | 320/166 |
| 5,783,930 | 7/1998 | Albert et al. | 320/140 |
| 5,804,994 | 9/1998 | Alberkrack et al. | 320/163 |
| 5,818,201 | 10/1998 | Stockstad et al. | 320/119 |

*Primary Examiner*—Peter S. Wong
*Assistant Examiner*—Gregory J. Toatley
*Attorney, Agent, or Firm*—Rennie William Dover

[57] ABSTRACT

A battery protection system (20) controls a process for charging a battery pack (15). A hysteresis comparator (54) senses a charging current flowing through the battery pack (15) and switches off a charging switch (31) to interrupt the charging current when the charging current reaches an upper limit. A transient current is then generated by an inductor (34). The hysteresis comparator (54) senses the transient current flowing through the battery pack (15) and switches on the charging switch (31) to regenerate the charging current when the transient current decreases substantially to zero. Periodically, a battery monitoring circuit (40) switches off the charging switch (31) and measures an open circuit voltage across each battery cell in the battery pack (15). In response to the open circuit voltage of a battery cell reaching a fully charged voltage, the battery monitoring circuit (40) switches off the charging switch (31) to terminate the charging process.

6 Claims, 2 Drawing Sheets

BATTERY PROTECTION SYSTEM AND PROCESS FOR CHARGING A BATTERY

This application is a continuation of Ser. No. 08/833,437 filed Apr. 7, 1997, now U.S. Pat. No. 5,804,944.

BACKGROUND OF THE INVENTION

The present invention relates, in general, to battery systems and, more particularly, to monitoring and protecting rechargeable batteries.

Lithium-ion batteries are preferred over other types of rechargeable batteries such as nickel-cadmium batteries and nickel metal-hydride batteries for portable electronics applications because of their light weight and high energy density. However, lithium-ion batteries are very sensitive to overcharging, and safety is a major concern with their use. For example, a safety concern with lithium-ion batteries is that metallic lithium may plate onto one of the electrodes within the battery cell when it is overcharged. The plated lithium poses a fire hazard because of the flammable nature of metallic lithium. Another safety concern is the venting of noxious fumes when the temperature of the battery cell becomes too high. Furthermore, in an over-discharge condition, the voltage across a lithium-ion battery cell falls below an under-voltage limit, resulting in a change in the chemical composition of the electrolyte in the battery cell. Consequently, the life of the battery cell may be significantly shortened. Therefore, it is important to have a battery protection system that accurately monitors the lithium-ion batteries and ensures that they operate within their safe operating areas.

Conventionally, charging a lithium-ion battery requires a dedicated lithium battery charger. When the voltage of the lithium-ion battery being charged is significantly less than a fully charged voltage of the battery, the dedicated lithium battery charger operates in a constant current mode and charges the battery with a constant charging current. When the battery voltage is near the fully charged voltage of the battery, the dedicated lithium battery charger switches to a constant voltage mode. Under the constant voltage mode, the charging current flowing in the battery decreases exponentially as the battery voltage approaches the fully charged voltage, thereby preventing the battery from becoming overcharged. The dedicated lithium battery charger includes a charge control circuit that determines when the dedicated lithium battery charger switches from the constant current mode to the constant voltage mode, how much charging current flows through the battery during the constant voltage mode, and when the battery is fully charged. In order to charge the battery to its maximum capacity and effectively avoid overcharging, the charge control circuit is designed to be highly accurate. Typically, the voltage fluctuation of the charge control circuit is less than one percent (%).

The highly accurate charge control circuit significantly increases the cost of the dedicated lithium battery charger and, therefore, increases the cost of using a lithium-ion battery. Further, because the charging current flowing in the battery decreases exponentially as the battery voltage approaches the fully charged voltage in the constant voltage mode, the charging process is time inefficient. For example, a lithium battery is usually charged up to 80% of its capacity during constant current mode operation in a time interval ranging between one and two hours. Then, the dedicated lithium battery charger switches to the constant voltage mode and takes at least three more hours to charge the lithium battery to its full capacity.

Accordingly, it would be advantageous to have a battery protection system and a process for charging a battery. It is desirable for the system and the charging process to be cost efficient. It is also desirable for the charging process to be convenient and time efficient.

DETAILED DESCRIPTION OF THE DRAWINGS

Generally, the present invention provides a battery protection system and a process for charging a battery. In accordance with the present invention, the battery protection system includes an accurate control circuit for controlling the battery charging process as well as protecting the battery. Thus, the present invention eliminates the need for a dedicated battery charger and, therefore, decreases the cost of using the battery. Further, the charging process of the present invention is time efficient compared with the prior art constant current/constant voltage charging process.

Figure 1:
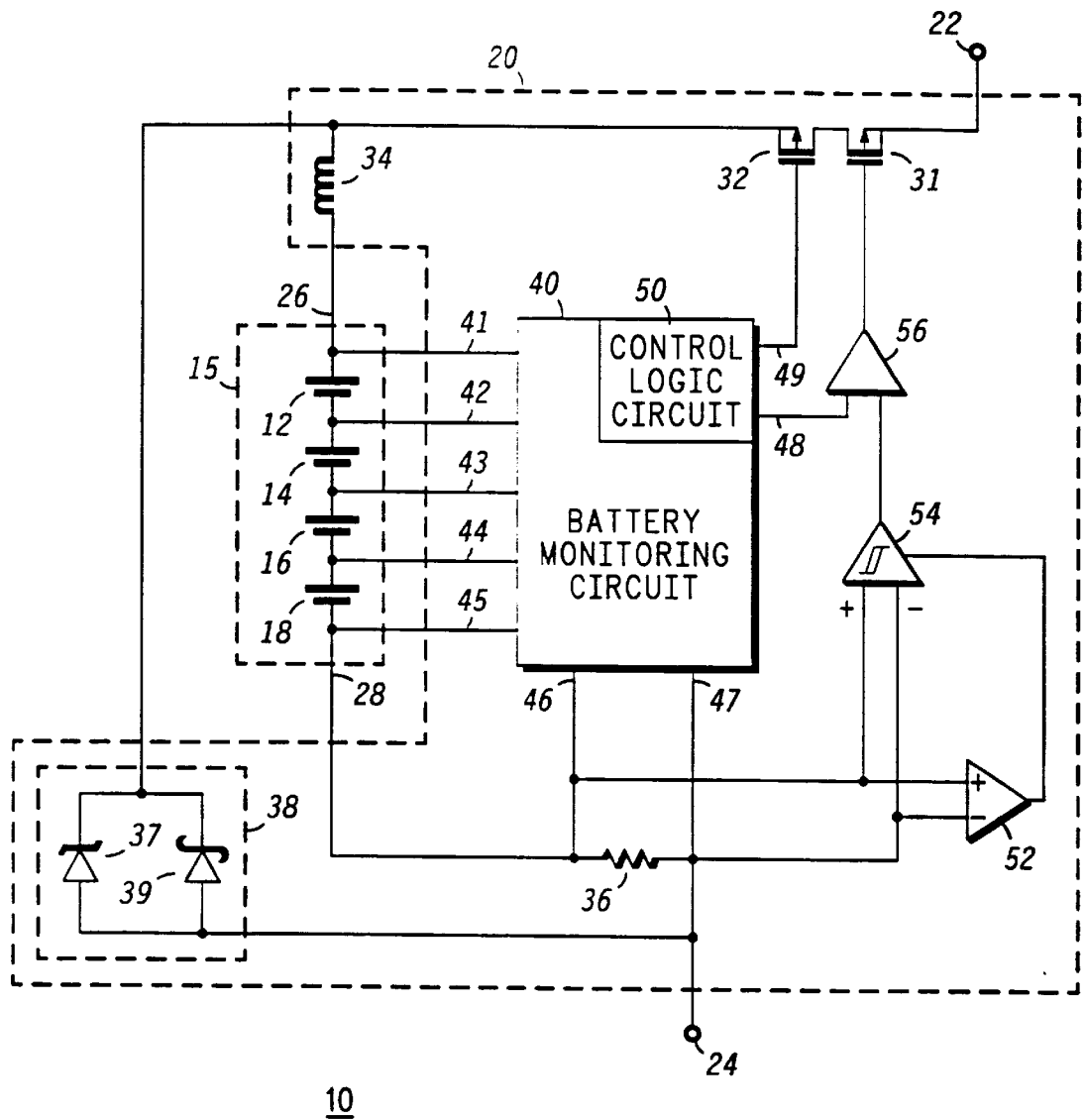
FIG 1 is a block diagram of a battery system in accordance with the present invention.

FIG. 1 is a block diagram of a battery system 10 in accordance with the present invention. Battery system 10 includes a battery pack 15 comprised of four serially coupled rechargeable lithium-ion battery cells 12, 14, 16, and 18. Therefore, battery system 10 is also referred to as a rechargeable battery system, and battery pack 15 is also referred to as a rechargeable battery pack. Battery system 10 also includes a battery protection system 20 which monitors battery pack 15 and performs appropriate operations to ensure that battery pack 15 operates in its safe operating area. Battery protection system 20 has a positive terminal 22 and a negative terminal 24, which serve as positive and negative terminals, respectively, of battery system 10. Battery protection system 20 also has a positive battery electrode 26 and a negative battery electrode 28, which are connected to the positive and negative terminals, respectively, of battery pack 15. Preferably, battery system 10 is an integral battery package, and battery pack 15 and battery protection system 20 are assembled in the integral battery package.

Battery protection system 20 includes p-channel insulated gate field effect transistors (FETs) 31 and 32, an inductor 34, a current sensing resistor 36, and a rectifier 38 comprised of a Zener diode 37 and a Schottky diode 39. An anode of Zener diode 37 and an anode of Schottky diode 39 are connected together to form an anode electrode of rectifier 38. A cathode of Zener diode 37 and a cathode of Schottky diode 39 are connected together to form a cathode electrode of rectifier 38. FET 31 has a source electrode connected to positive terminal 22 of battery protection system 20 and a drain electrode connected to a drain electrode of FET 32. Inductor 34 has a first electrode connected to a source electrode of FET 32 and to the cathode electrode of rectifier 38 and a second electrode connected to positive battery electrode 26 of battery protection system 20. Current sensing resistor 36 has a first electrode connected to negative battery electrode 28 of battery protection system 20 and a second electrode connected to the anode electrode of rectifier 38 and to negative terminal 24 of battery protection system 20.

Battery protection system 20 also includes a battery monitoring circuit 40 having voltage sensing inputs 41, 42, 43, 44, and 45, current sensing inputs 46 and 47, and outputs 48 and 49. Voltage sensing input 41 is connected to a positive electrode of battery cell 12. Voltage sensing input 42 is connected to a negative electrode of battery cell 12 and to a positive electrode of battery cell 14. Voltage sensing input 43 is connected to a negative electrode of battery cell 14 and to a positive electrode of battery cell 16. Voltage sensing input 44 is connected to a negative electrode of battery cell 16 and to a positive electrode of battery cell 18. Voltage sensing input 45 is connected to a negative electrode of battery cell 18. Current sensing inputs 46 and 47 are connected to the first and second electrodes, respectively, of current sensing resistor 36. Output 49 is connected to a gate electrode of FET 32.

Battery protection system 20 further includes a comparator 52, a hysteresis comparator 54, and a FET driver 56. Comparator 52 has a non-inverting input and an inverting input connected to the first and second electrodes, respectively, of current sensing resistor 36. Hysteresis comparator 54 has a non-inverting input and an inverting input connected to the first and second electrodes, respectively, of current sensing resistor 36. An output of comparator 52 is connected to an enabling terminal of hysteresis comparator 54. An output of hysteresis comparator 54 is connected to a first input of FET driver 56. A second input of FET driver 56 is connected to output 48 of battery monitoring circuit 40. An output of FET driver 56 is connected to a gate electrode of FET 31.

Although FIG. 1 shows battery pack 15 having four battery cells, it should be understood that this is not a limitation of the present invention. In accordance with the present invention, battery pack 15 may include any number of battery cells, such as one, two, three, five, six, etc. Preferably, the number of voltage sensing inputs of battery monitoring circuit 40 is such that the voltage of each battery cell in battery pack 15 can be measured. It should also be understood that battery cells 12, 14, 16, and 18 are not limited to being lithium-ion battery cells. They can be replaced by other types of battery cells such as, for example, nickel-cadmium battery cells, nickel metal-hydride battery cells, etc.

In battery protection system 20, FETs 31 and 32 serve as switches for interrupting charging and discharging currents, respectively, flowing through battery pack 15 when the respective overcharge and over-discharge conditions develop. Because of their body diodes, FET 31 only interrupts a charging current when switched-off and FET 32 only interrupts a discharging current when switched-off. A charging current is a current flowing through battery pack 15 from its positive terminal to its negative terminal. A discharging current is a current flowing through battery pack 15 from its negative terminal to its positive terminal. It should be understood that FETs 31 and 32 are not limited to being insulated gate FETs. Any switching device having a control electrode and two current conducting electrodes can replace FET 31 or FET 32. As those skilled in the art are aware, when a FET serves as a switch, the gate electrode of the FET functions as a control electrode of the switch, and the source and drain electrodes of the FET function as current conducting electrodes of the switch.

It should also be understood that battery protection system 20 is not limited to employing high side switches, such as FETs 31 and 32, to protect battery pack 15. In an alternative embodiment, battery protection system 20 includes two low side switches (not shown) coupled between current sensing resistor 36 and negative terminal 24 for interrupting charging and discharging currents, respectively, flowing through battery pack 15 when the respective overcharge and over-discharge conditions develop. In another alternative embodiment, battery protection system 20 includes a high side switch, such as FET 31, for interrupting the charging current and a low side switch (not shown) coupled between current sensing resistor 36 and negative terminal 24 for interrupting the discharging current flowing through battery pack 15 when the respective overcharge and over-discharge conditions develop. In yet another alternative embodiment, battery protection system 20 includes a high side switch, such as FET 32, for interrupting the discharging current and a low side switch (not shown) coupled between current sensing resistor 36 and negative terminal 24 for interrupting the charging current flowing through battery pack 15 when the respective over-discharge and overcharge conditions develop. Preferably, a high side switch, such as FET 31 or FET 32, includes a p-channel insulated gate FET, and a low side switch includes an n-channel insulated gate FET.

Resistor 36 functions as a current sensor that develops a voltage across its two electrodes when a current flowing through it. It can be replaced by other types of current sensing elements, e.g., a filament, etc. In order to minimize the power loss when battery system 10 supplies energy to a load (not shown) coupled across terminals 22 and 24, current sensing resistor 36 preferably has a small resistance, e.g., less than approximately one ohm ($\Omega$). In a preferred embodiment of the present invention, the resistance of current sensing resistor 36 is approximately ten milli-ohms (m$\Omega$).

Inductor 34, rectifier 38, comparator 52, and hysteresis comparator 54 form charging control circuitry, which is referred to as a charging controller or a charger interface circuit. The charging controller monitors a battery charging current flowing in current sensing resistor 36. When the battery charging current is above a first current value, the charging controller interrupts the battery charging current by switching off FET 31, and induces a transient current flowing through inductor 34, battery pack 15, current sensing resistor 36, and rectifier 38. When the transient current is below a second current value, e.g., substantially zero, that is less than the first current value, the charging controller resumes the battery charging current by switching on FET 31.

In rectifier 38, Zener diode 37 prevents a large transient voltage drop across FET 31 from occurring when a large discharging current flowing in battery pack 15 is interrupted, and Schottky diode 39 provides a low resistance conduction path when forward biased and, therefore, minimizes the power consumption of rectifier 38. Preferably, Zener diode 37 has a breakdown voltage greater than a fully charged voltage of battery pack 15. It should be understood that rectifier 38 can be replaced by other types of rectifying devices and circuit elements. For example, rectifier 38 may include a single diode that has a breakdown voltage greater than the fully charged voltage of battery pack 15.

Comparator 52 turns on hysteresis comparator 54 and enables the charging control circuitry only when a charging current is flowing through battery pack 15. When there is a discharging current flowing through battery pack 15 or when battery pack 15 is idle, comparator 52 generates a logic low voltage level at its output. The logic low voltage level is transmitted to the enabling terminal of hysteresis comparator 54 and turns off hysteresis comparator 54, thereby disabling the charging control circuitry and minimizing the current drain of battery system 10. It should be understood that, although preferred, comparator 52 is an optional feature of the present invention.

Hysteresis comparator 54 switches FET 31 off via FET driver 56 when the charging current flowing in battery pack 15 exceeds an upper limit. Hysteresis comparator 54 senses the charging current flowing in battery pack 15 by sensing a voltage drop across current sensing resistor 36. As discussed hereinbefore, current sensing resistor 36 preferably has a small resistance. Thus, hysteresis comparator 54 is preferably capable of switching FET 31 off via FET driver 56 in response to small input signals at the inputs of hysteresis comparator 54, e.g., input signals having a voltage on the order of ten milli-volts (mV). In addition, hysteresis comparator 54 may include a temperature compensation circuit (not shown), thereby providing a stable upper limit for the charging current over temperature variations in battery system 10.

FET driver 56 serves as a buffer that switches FET 31 on and off in response to the signals transmitted from battery monitoring circuit 40 and hysteresis comparator 54 to the two inputs of FET driver 56. Preferably, FET driver 56 is able to switch FET 31 on and off at a high frequency such as, for example, approximately 100 kilo-Hertz (kHz) or higher. It should be understood that FET driver 56 is optional in battery protection system 20. In an alternative embodiment of the present invention, the output of hysteresis comparator 54 and output 48 of battery monitoring circuit 40 are directly coupled to the gate electrode of FET 31. The frequency at which FET 31 is switched on and off during the process of charging battery pack 15 is determined by the inductance of inductor 34. A larger inductance allows FET 31 to be switched at a lower frequency, but increases the size, weight, and cost of inductor 34. Preferably, the inductance of inductor 34 is in a range between approximately one micro-Henry ($\mu$H) and approximately 100 $\mu$H. A nominal value for the inductance of inductor 34 is approximately 10 $\mu$H.

Battery monitoring circuit 40 periodically performs a safety monitoring operation on battery pack 15. Through voltage sensing inputs 41, 42, 43, 44, and 45, battery monitoring circuit 40 measures the voltage of each of battery cells 12, 14, 16, and 18 in battery pack 15. Through current sensing inputs 46 and 47, battery monitoring circuit 40 measures the current flowing in battery pack 15 by measuring the voltage across current sensing resistor 36. Based on these measurements, a control logic circuit 50 in battery monitoring circuit 40 performs appropriate operations to ensure that battery pack 15 operates in its safe operating area.

The safe operating area includes upper and lower limits for the voltage across each of battery cells 12, 14, 16, and 18 in battery pack 15. It also includes the upper limits for the charging and discharging currents flowing through battery pack 15. If any of the safe operating limits are exceeded, control logic circuit 50 adjusts the corresponding parameters to be within their limits or terminates the condition which caused the corresponding parameters to exceed their safe operating limits. For example, if an over-voltage condition is detected, control logic circuit 50 switches FET 31 off and, if necessary, performs battery cell balancing operations on battery pack 15. If an under-voltage condition is detected, FET 32 is switched off, and battery protection system 20 enters a hibernation state characterized by extremely low power consumption. Battery protection system 20 wakes up, i.e., leaves the hibernation state and returns to its normal operating state when a current flowing into positive terminal 22 is detected. If an over-current condition is detected, control logic circuit 50 switches off either FET 31 or FET 32 to terminate the over-current condition. It should be noted that FET 31 is switched off if the over-current is flowing in battery pack 15 in a direction from positive battery electrode 26 to negative battery electrode 28, and FET 32 is switched off if the over-current is flowing in battery pack 15 in a direction from negative battery electrode 28 to positive battery electrode 26. In order to ensure safe operation and achieve maximum energy efficiency of battery pack 15, control logic circuit 50 in battery monitoring circuit 40 is designed to be highly accurate. Typically, the voltage fluctuation of control logic circuit 50 is preferably less than approximately one percent (%).

It should be understood that battery monitoring circuit 40 is not limited to monitoring the voltage of each battery cell and the current flowing in battery pack 15. In an alternative embodiment of the present invention, battery monitoring circuit 40 also monitors an ambient temperature of battery pack 15. In another alternative embodiment of the present invention, battery monitoring circuit 40 includes a battery cell detection circuit (not shown) that detects the number of battery cells in battery pack 15. The operation of a battery control circuit such as battery monitoring circuit 40 is described in co-pending U.S. patent application Ser. No. 08/398,255, attorney's docket No. SC09078C, entitled "CIRCUIT AND METHOD FOR BATTERY CHARGE CONTROL", by Troy L. Stockstad et al. and assigned to Motorola, Inc. U.S. patent application Ser. No. 08/398,255 is hereby incorporated herein by reference.

Figure 2:
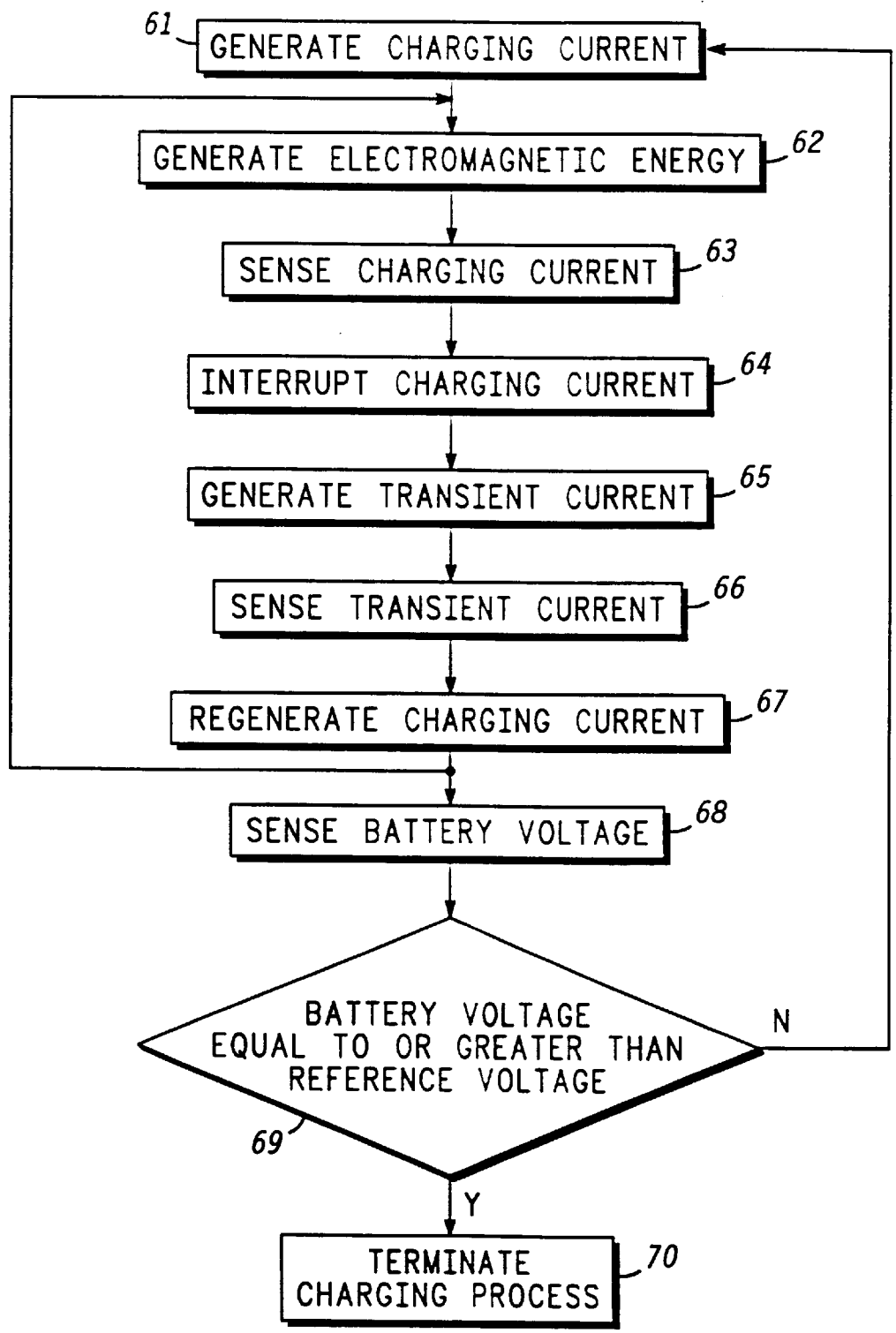
FIG. 2 is a flow chart of a process for charging a battery in accordance with the present invention.

FIG. 2 is a flow chart 60 of a process for charging a battery in accordance with the present invention. By way of example, the battery is shown in FIG. 1 as battery pack 15 coupled to battery protection system 20.

To charge battery pack 15 in battery system 10 of FIG. 1, the positive and negative terminals of a voltage source (not shown) are coupled to positive terminal 22 and negative terminal 24, respectively, of battery system 10. FET 31 is switched on by a logic low voltage level at its gate electrode. A charging current is generated (reference numeral 61 in FIG. 2) and flows from the positive terminal of the voltage source (not shown) through conductive FET 31, FET 32, inductor 34, battery pack 15, and current sensing resistor 36, to the negative terminal of the voltage source (not shown). Rectifier 38 is reverse biased and nonconductive. Because of inductor 34, the charging current increases gradually from zero. Further, a portion of the electrical energy in the charging current is converted to electromagnetic energy. In other words, electromagnetic energy is generated using the charging current (reference numeral 62 in FIG. 2) and stored in inductor 34.

The charging current develops a voltage difference across current sensing resistor 36. Comparator 52 senses the voltage difference across current sensing resistor 36. With its non-inverting input at a higher voltage level than its inverting input, comparator 52 generates a logic high voltage level at its output. The logic high voltage level is transmitted to the enabling terminal of hysteresis comparator 54. Hysteresis comparator 54 is enabled and senses the voltage difference across its two inputs, thereby sensing the charging current flowing in battery pack 15 and current sensing resistor 36 (reference numeral 63 in FIG. 2).

The voltage difference across the two inputs of hysteresis comparator 54 is proportional to the current flowing in battery pack 15. When the charging current flowing through battery pack 15 is smaller than a predetermined current value, e.g., approximately 3 amperes (A), the voltage difference across the two inputs of hysteresis comparator 54 is smaller than a first threshold voltage value of hysteresis comparator 54, e.g., approximately 30 mV. Hysteresis comparator 54 generates a logic low voltage level at its output.

The logic low voltage level is transmitted to the gate electrode of FET 31 via FET driver 56. FET 31 remains conductive, and the charging current continues to flow through battery pack 15. When the charging current rises beyond the predetermined current value, e.g., approximately 3 A, the voltage level at the non-inverting input of hysteresis comparator 54 is higher than that at the inverting input of hysteresis comparator 54 and the voltage difference is greater than the first threshold voltage value, e.g., approximately 30 mV. Hysteresis comparator 54 generates a logic high voltage level at its output. FET driver 56 transmits the logic high voltage level to the gate electrode of FET 31, which switches off to interrupt the charging current flowing from the voltage source (not shown) to battery pack 15 (reference numeral 64 in FIG. 2).

In response to FET 31 being switched off and the charging current being interrupted, the electromagnetic energy stored in inductor 34 is released to generate a transient current flowing through battery pack 15, current sensing resistor 36, and forward biased rectifier 38 (reference numeral 65 in FIG. 2). Hysteresis comparator 54 continues to sense the voltage difference across its two inputs and, therefore, senses the transient current flowing in battery pack 15 (reference numeral 66 in FIG. 2). When the transient current decreases to another predetermined current value, e.g., a current value which is substantially equal to zero, the voltage difference across the two inputs of hysteresis comparator 54 falls to a corresponding voltage value, e.g., a voltage value substantially equal to zero, which is less than a second threshold voltage of hysteresis comparator 54. The voltage level at the output of hysteresis comparator 54 switches back to the logic low voltage level. The logic low voltage level is transmitted to the gate electrode of FET 31 via FET driver 56, thereby switching on FET 31 and regenerating the charging current flowing from the voltage source (not shown) to battery pack 15 via conductive FET 31 (reference numeral 67 in FIG. 2). Then, inductor 34 repeats the step of generating electromagnetic energy using the charging current (reference numeral 62 in FIG. 2), and hysteresis comparator 54 repeats the step of sensing the charging current flowing in battery pack 15 (reference numeral 63 in FIG. 2).

As described hereinbefore, the current flowing in battery pack 15 during the charging process is a pulsed current modulated by FET 31, inductor 34, and hysteresis comparator 54. The frequency at which the charging current is interrupted and regenerated depends on the inductance of inductor 34, a charging voltage supplied by the voltage source (not shown) coupled to positive terminal 22 and negative terminal 24, the voltage of battery pack 15, and the threshold voltages at which hysteresis comparator 54 switches its output voltage level. Generally, a small inductance and/or a large voltage difference between the charging voltage and the voltage of battery pack 15 will result in a high frequency at which the charging current is interrupted and regenerated. Typically, the frequency is between approximately 50 kHz and approximately 200 kHz. A nominal frequency is approximately 100 kHz.

During the charging process, control logic circuit 50 in battery monitoring circuit 40 periodically generates a logic high voltage level at output 48. The logic high voltage level at output 48 is transmitted to the gate electrode of FET 31 via FET driver 56 and switches FET 31 off, thereby interrupting the charging current flowing in battery pack 15. Preferably, FET 31 remains nonconductive for a time interval that is sufficiently long for the transient current flowing in battery pack 15 to decrease to substantially zero. Battery monitoring circuit 40 then senses the voltage across each of battery cells 12, 14, 16, and 18 in battery pack 15 (reference numeral 68 in FIG. 2). Because the current flowing in battery pack 15 is substantially zero, the voltage of each of battery cells 12, 14, 16, and 18 sensed by battery monitoring circuit 40 is substantially equal to an open circuit voltage of the respective battery cell. The sensed voltage of each of battery cells 12, 14, 16, and 18 is compared with a reference voltage in control logic circuit 50 (reference numeral 69 in FIG. 2). Preferably, the reference voltage is equal to a fully charged voltage of each of battery cells 12, 14, 16, and 18.

If the sensed voltage of each of battery cells 12, 14, 16, and 18 is lower than the reference voltage, control logic circuit 50 generates a logic low voltage level at output 48. The logic low voltage level is transmitted to the gate electrode of FET 31 via FET driver 56. FET 31 is switched on, and the steps of generating the charging current, generating the electromagnetic energy, sensing the charging current, interrupting the charging current, generating the transient current, sensing the transient current, regenerating the charging current, and sensing the voltage across each of battery cells 12, 14, 16, and 18 (reference numerals 61, 62, 63, 64, 65, 66, 67, and 68 respectively, in FIG. 2) are repeated.

If the sensed voltage of a battery cell in battery pack 15 is substantially equal to or higher than the reference voltage, the voltage level at output 48 of battery monitoring circuit 40 remains at the logic high voltage level. FET 31 is latched off and the charging process is terminated (reference numeral 70 in FIG. 2). If necessary, battery monitoring circuit 40 performs the battery cell balancing operation on battery pack 15 by discharging the battery cell that has the highest voltage. After the battery cell balancing operation, battery monitoring circuit 40 may restart the charging process by switching on FET 31 if the voltage of each of battery cells 12, 14, 16, and 18 in battery pack 15 is lower than the reference voltage in control logic circuit 50.

The frequency at which battery monitoring circuit 40 switches FET 31 off and senses the voltage across each of battery cells 12, 14, 16, and 18 in battery pack 15 during the charging process is determined by a timer (not shown) in control logic circuit 50. The timer also determines how long FET 31 remains nonconductive each time FET 31 is switched off by battery monitoring circuit 40. By way of example, battery monitoring circuit 40 switches FET 31 off once in a time period of approximately one second (s) during the charging process. Further, FET 31 remains nonconductive for a time interval of approximately twenty milliseconds (ms) each time it is switched off by battery monitoring circuit 40. However, it should be understood that the frequency and time interval of FET 31 being switched off by battery monitoring circuit 40 during the charging process are not limited to these values. In alternative embodiments of the present invention, FET 31 may be switched off by battery monitoring circuit 40 once for a time interval of 10 ms, 15 ms, or 25 ms in a time period of 0.5 s, 1.5 s, or 2 s during the process of charging battery system 10. By switching off FET 31 at a higher frequency and for a longer time interval, the voltage of each of battery cells 12, 14, 16, and 18 can be monitored more closely and accurately, ensuring battery pack 15 operates in the safe operating area. However, the charging process would be less time efficient.

Accordingly, FET 31, inductor 34, current sensing resistor 36, rectifier 38, battery monitoring circuit 40, comparator 52, hysteresis comparator 54, and FET driver 56 cooperate to control the charging current flowing in battery pack 15 during the process of charging battery pack 15 in battery system 10. In other words, control logic circuit 50 in battery monitoring circuit 40 serves to control the charging process as well as to protect battery pack 15. Thus, the need for a dedicated lithium battery charger that includes a highly accurate charge control circuit is eliminated. Battery system 10 can be coupled to an unregulated voltage source to charge battery pack 15. In other words, the redundancy of having two accurate control circuits, one in the battery protection system and the other in the dedicated lithium battery charger, as required in the prior art charging process is eliminated. The cost of using a lithium-ion battery pack coupled to battery protection system 20 and packaged in battery system 10 is significantly reduced compared with the cost of using a lithium-ion battery pack coupled to a prior art battery protection system. Further, the current flowing in battery pack 15 during the charging process is a pulsed current. The average charging current flowing in battery pack 15 is larger than the average charging current in the prior art constant current/constant voltage charging process. Therefore, the process of charging battery system 10 in accordance with the present invention is more time efficient than the prior art constant current/constant voltage charging process.

By now it should be appreciated that a battery protection system and a process for charging a battery have been provided. In accordance with the present invention, an accurate control circuit in the battery protection system controls the battery charging process as well as protects the battery pack, thereby eliminating the need for a dedicated battery charger. The battery can be charged using an unregulated voltage source, which is inexpensive, widely available, and easy to use. Thus, charging the battery in accordance with the present invention is convenient and cost efficient. Further, the charging process of the present invention is more time efficient than the prior art constant current/ constant voltage charging process.

We claim:

1. A process for charging a battery, comprising the steps of:

generating a first current flowing through the battery;
   interrupting the first current in response to the first current being greater than a first current value; inducing a second current flowing through the battery in response to the first current being interrupted; regenerating the first current in response to the second current being less than a second current value, the second current value being smaller than the first current value;

sensing a voltage across the battery; and repeating the steps of generating the first current, interrupting the first current, inducing the second current, and regenerating the first current in response to the voltage being less than a voltage value.

2. The process as claimed in claim 1, wherein:

the step of generating a first current further includes the step of generating an electromagnetic energy from a portion of an electrical energy in the first current; and the step of inducing a second current includes inducing the second current by releasing the electromagnetic energy.

3. The process as claimed in claim 1, wherein the step of inducing a second current further includes establishing a conduction path from a negative terminal of the battery to a positive terminal of the battery via a rectifier.

4. The process as claimed in claim 1, wherein the step of sensing a voltage across the battery includes sensing a voltage across a battery cell of a plurality of serially coupled battery cells in the battery.

5. The process as claimed in claim 1, wherein the step of sensing a voltage across the battery further includes the steps of:

interrupting the first current; and sensing an open circuit voltage of across a battery cell of a plurality of serially coupled battery cells in the battery when the second current is substantially zero.

6. The process as claimed in claim 1, wherein the step of sensing a voltage across the battery includes periodically sensing the voltage across the battery.

* * * * *